Nov. 4, 1924.  1,514,106
J. C. SAVAGE
SMOKE, LUMINOUS, OR OTHER TRAIL FROM AIRCRAFT
Filed June 30, 1922
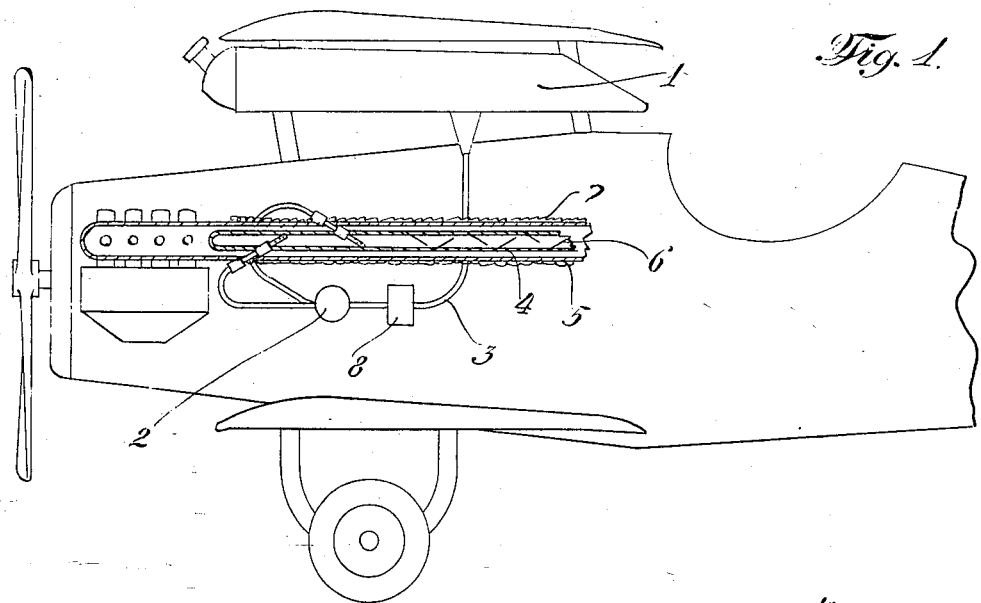
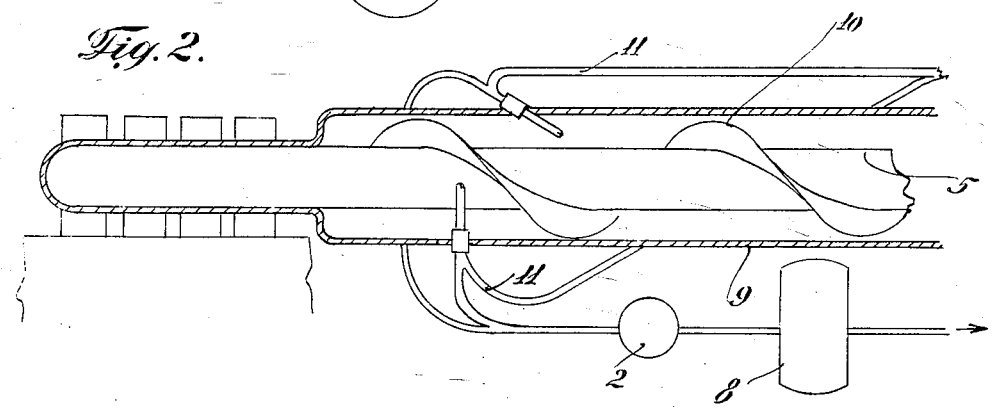
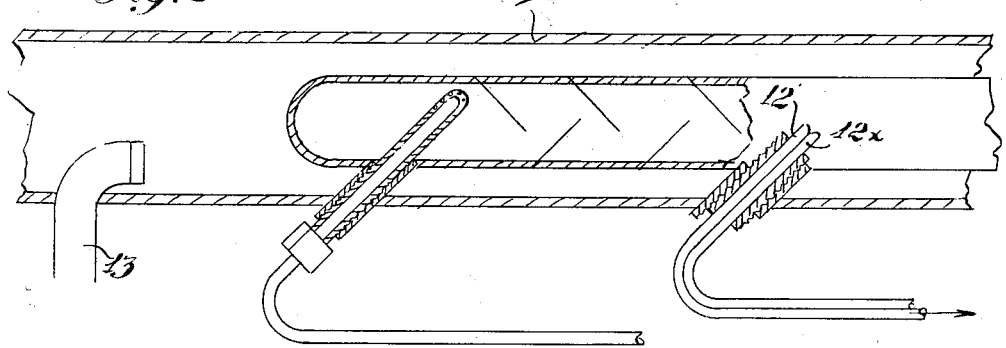
Inventor
John Clifford Savage
By his Attorney Patented Nov. 4, 1924.

1,514,106

UNITED STATES PATENT OFFICE.

JOHN C. SAVAGE, OF RYDE, ISLE OF WIGHT, ENGLAND, ASSIGNOR TO THE SKYWRITING CORPORATION OF AMERICA.

SMOKE, LUMINOUS, OR OTHER TRAIL FROM AIRCRAFT.

Application filed June 30, 1922. Serial No. 572,034.

*To all whom it may concern:*

Be it known that I, JOHN CLIFFORD SAVAGE, subject of the King of Great Britain, residing at Ryde, Isle of Wight, England, have invented new and useful Improvements Relating to Smoke, Luminous, or Other Trails from Aircraft, of which the following is a specification.

This invention relates to the formation of smoke, luminous or other visible trails from aircraft in flight, for signalling advertising and other purposes and its main object is to provide improved means for the forming of the required trails.

The object of the invention may be attained by providing the aircraft with a container or receptacle for the storage of the material used for the production of the smoke luminous or other visible trail, this container or receptacle communicating by means of a pipe line or pipe lines and valve or valves either with a jacket or jackets heated by the exhaust gases of the motor or with the exhaust pipe or pipes. Each jacket may either pass down the interior of the exhaust passage or it may be arranged around its exterior and is so designed that a maximum amount of heat is available to cause reaction and/or vaporization of the smoke producing material introduced into the jacket.

The one or more jackets or exhaust pipes may be fitted internally with baffles or packed with refractory material and the whole lagged with asbestos or other non-conducting material to conserve heat and to ensure that the smoke producing material will be intimately heated for such a time and at such a temperature as to complete the desired reaction and/or vaporization.

In certain cases it may be desirable or essential to impregnate the refractory material with a catalytic agent.

The smoke producing material referred to may either be a simple liquid such as anthracene oil or other fluid; a complex liquid such as a mixture of a suitable hydrocarbon and an organic chloride in suitable proportions with or without other liquids; a simple solution such as naphthalene in turpentine; a complex solution; a mixture of complex solutions or any of the above with solid matter, preferably not a colouring matter, held in suspension.

Figure 1 is a fragmentary elevation of an aircraft fuselage illustrating, somewhat diagrammatically, the improvements, and Figure 2 is an enlarged diagrammatic view of a somewhat modified form of the improvements.

Figure 3 is an enlarged sectional view of the aircraft engine exhaust conduit having associated therewith a further modified form of the improvements.

According to one method of and means for carrying the invention into effect the trail producing material passes under the control of the pilot from a receptacle 1 on the aircraft by way of a valve 2 and pipe line 3 to a jacket 4 located axially within the exhaust pipe 5. Inside the jacket may be arranged baffles 6 to take up and transmit the heat of the exhaust gases to the trail producing material, also to ensure intimate contact of the materials and to ensure the retention of the material within the jacket for a sufficient length of time to effect a complete reaction and/or vaporization. In order to obtain a sufficiently high temperature around the jacket the adjacent portion of the exhaust pipe may be lagged with asbestos 7 or other heat retaining material. The material from the receptacle may gravitate to the jacket or may be impelled by the pressure of air or other gas or by a pump 8 preferably of the non-impulse type arranged between the receptacle and the jacket and maintaining a constant pressure and volume of delivery at the operating valve.

In the modified construction illustrated in Figure 2, the jacket 9 instead of being arranged within the exhaust pipe 5 surrounds a portion of the latter. The baffle may take the form of a broad spiral blade 10. The interior of the jacket may be lined or packed with refractory material which may if desired be impregnated with a catalytic agent to promote the smoke producing reaction in the case of using two or more materials adapted to produce smoke by chemical reaction with one another. The outside of the jacket may be suitably lagged.

If desired the smoke producing material may be sprayed by means of pipes 11 with air or any other gas or mixture of gases into the jackets or exhaust pipes this ensuring more complete atomization and in certain cases providing a supply of oxygen or other gas which will assist or complete the desired reaction.

Cases may be encountered in which the temperature of the exhaust gases is not sufficiently high to bring about the desired reaction or vaporization in which event either a "hot spot" such as an oxy-hydrogen or oxy-acetylene flame can be provided by leading the said oxy-hydrogen or oxy-acetylene through the pipes 12, 12× (Figure 3) or the temperature of the exhaust gases may be increased by introducing into the exhaust pipe at 13 a carburetted mixture of gasoline or other fuel and air or other gas in combustible proportions.

The object and effect of utilizing the heat of the exhaust gases as above described is to obtain a more intense and rapid evolution or production of smoke than would otherwise be obtained. In a number of cases the provision of an actual jacket for the purpose as above described is essential because many apparently suitable smoke producing reagents which should combine or react with one another or with the exhaust gases or should evolve smoke products at the temperature of the exhaust gases of a petrol engine do not do so owing amongst other reasons to the dilution of the materials by the exhaust gases themselves and to the excessive speed of escape of the same gases. There are however instances where owing to rapid vaporization and/or reaction the use of an actual exhaust heated jacket is not essential and in such cases the smoke producing material may be injected into the exhaust pipe in direct contact with the exhaust gases.

As hereinbefore stated the smoke producing material employed in accordance with this invention may be either a simple liquid such as anthracene oil or other fluid, a complex liquid such as a mixture of a suitable liquid hydrocarbon and a liquid organic chloride in suitable proportions with or without other liquids; a simple solution such as naphthalene in turpentine; a complex solution of two or more substances in a solvent; a mixture of simple or complex solutions; or any of the above with solid matter preferably not a colouring matter held in suspension.

What I claim is:—

1. In a motor driven aircraft, means for producing visible trails for aerial advertising or other purposes, comprising a chamber in close proximity to the exhaust passages of the aircraft motor to receive heat from the exhaust gases, a second chamber for containing a trail producing material, means for effecting a passage of said material from the second to the first chamber in which the heat is utilized to effect a production of the visible trail from said material, and means for discharging the visible trail into the atmosphere.

2. In a motor driven aircraft, means for producing visible trails for aerial advertising or other purposes, comprising a chamber in close proximity to the exhaust passages of the aircraft motor to receive heat from the exhaust gases, a second chamber for containing a trail producing material, in the form of a simple liquid, for example anthracene oil; a complex liquid such as a mixture of a liquid hydrocarbon for example turpentine, and a liquid organic chloride with or without other liquids, a simple solution for example naphthalene in turpentine, a complex solution of two or more substances in a solvent, a mixture of simple or complex solutions, or any of the foregoing with solid matter held in suspension, and means for discharging the heat treated material into the atmosphere.

3. In an aircraft, means for producing visible trails for aerial advertising or other purposes, comprising an exhaust chamber into which the hot exhaust gases are led, a second chamber closely associated with the first chamber to receive the radiated heat therefrom, means for leading a liquid visualizing material to said second chamber, and means for discharging the heat-treated visualizing material into the atmosphere.

4. In an aircraft, means for producing visible trails for aerial advertising or other purposes, comprising an exhaust chamber into which the hot exhaust gases are led, means for superheating the said exhaust gases, a second chamber closely associated with the first chamber to receive the radiated heat therefrom, means for leading a liquid visualizing material to said second chamber, and means for discharging the heat-treated visualizing material into the atmosphere.

5. The method of issuing a smoke trail from a vehicle propelled by an internal combustion motor, comprising: directing the motor exhaust gases in contact with a heat convecting element which absorbs heat from said exhaust gases; and bringing a smoke producing substance into contact with said heat convecting element.

6. The method of issuing a smoke trail from a vehicle propelled by an internal combustion motor, comprising: employing the exhaust gases from the motor to heat a heat convecting element; and directing a smoke producing substance along said heat convecting element so that heat from said element will be imparted to said smoke producing substance.

7. The method of issuing a smoke trail from a vehicle propelled by an internal combustion motor, comprising: directing the motor exhaust gases in contact with one side of a thin heat convecting element; and placing a volatile smoke producing substance in proximity with the other side of said heat convecting element so that heat for volatilization will be imparted to said smoke producing substance.

8. In apparatus of the class described, the combination of: a heat convecting element; means for directing the combustion gases from an internal combustion motor in contact with said element; and means for placing a smoke producing medium in proximity with said element so that heat will be imparted to said smoke producing medium.

9. In apparatus of the class described, the combination of: a heat convecting element; means for directing the combustion gases from an internal combustion motor in contact with said element; and means for bringing a smoke producing medium into contact with said element so that heat will be imparted to said smoke producing medium.

10. In apparatus of the class described the combination of: an internal combustion motor employed to propel a vehicle; a comparatively thin heat convecting element; means for directing the exhaust gases from said motor in contact with one side of said heat convecting element; and means for placing a volatile smoke producing substance in proximity with the other side of said element so that heat for volatilization will be imparted to said smoke producing substance.

11. In apparatus of the class described the combination of: an internal combustion motor employed to propel a vehicle; a comparatively thin heat convecting element; a tubular member for directing the exhaust gases from said motor in contact with one side of said heat convecting element; and means for placing a volatile smoke producing substance in proximity with the other side of said element so that heat for volatilization will be imparted to said smoke producing substance.

12. In apparatus of the class described the combination of: an internal combustion motor employed to propel a vehicle; a comparatively thin heat convecting element; a tubular member for directing the exhaust gases from said motor in proximity with one side of said heat convecting element; and means for placing a volatile smoke producing substance in proximity with the other side of said element so that heat for volatilization will be imparted to said smoke producing substance.

13. In apparatus of the class described, the combination of: a heat convecting element; means for directing the combustion gases from an internal combustion motor in contact with said element; and means for placing a smoke producing medium in proximity with said element so that heat will be imparted to said smoke producing medium; and means for controlling the issue of smoke from said element.

14. In apparatus of the class described the combination of: an internal combustion motor employed to propel a vehicle; a comparatively thin heat convecting element; means for directing the exhaust gases from said motor in contact with one side of said heat convecting element; and means for placing a volatile smoke producing substance in proximity with the other side of said element so that heat for volatilization will be imparted to said smoke producing substance; and means for controlling the issue of smoke from said element.

15. In apparatus of the class described the combination of: an internal combustion motor employed to propel a vehicle; a comparatively thin heat convecting element; a tubular member for directing the exhaust gases from said motor in proximity with one side of said heat convecting element; and means for placing a volatile smoke producing substance in proximity with the other side of said element so that heat for volatilization will be imparted to said smoke producing substance; and means for controlling the issue of smoke from said element.

J. C. SAVAGE.